United States Patent
Nishimura

(10) Patent No.: US 11,870,969 B2
(45) Date of Patent: Jan. 9, 2024

(54) IMAGING APPARATUS, PORTABLE TERMINAL APPARATUS, AND IMAGING METHOD

(71) Applicant: SEIKO EPSON CORPORATION, Tokyo (JP)

(72) Inventor: Teruyuki Nishimura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 54 days.

(21) Appl. No.: 17/329,689

(22) Filed: May 25, 2021

(65) Prior Publication Data

US 2021/0377510 A1 Dec. 2, 2021

(30) Foreign Application Priority Data

May 28, 2020 (JP) ................. 2020-092970

(51) Int. Cl.
*H04N 13/257* (2018.01)
*H04N 13/296* (2018.01)
(Continued)

(52) U.S. Cl.
CPC ........... *H04N 13/257* (2018.05); *H04N 13/15* (2018.05); *H04N 13/296* (2018.05); *H04N 2013/0077* (2013.01)

(58) Field of Classification Search
CPC .... H04N 13/15; H04N 13/257; H04N 13/296; H04N 2013/0077; H04N 5/232;
(Continued)

(56) References Cited

U.S. PATENT DOCUMENTS

2013/0250123 A1  9/2013 Zhang et al.
2014/0078285 A1* 3/2014 Mitsui ................ G02B 21/0004
                                                         348/135
(Continued)

FOREIGN PATENT DOCUMENTS

CN    103888681 A      6/2014
CN    108322670 A  *  7/2018  ............. H04N 5/232
(Continued)

OTHER PUBLICATIONS

Machine translation of CN 108322670 A. (Year: 2018).*

*Primary Examiner* — Christopher S Kelley
*Assistant Examiner* — Ana Picon-Feliciano
(74) *Attorney, Agent, or Firm* — CHIP LAW GROUP

(57) ABSTRACT

An imaging apparatus includes a first camera, a second camera, a first imaging condition setting portion, and a second imaging condition setting portion. The first camera includes a color filter portion and a first light receiving portion receiving light transmitted through the color filter portion, and which captures a color imaged. The second camera includes a spectroscopic element to disperse light having a predetermined spectral wavelength from incident light and to change the spectral wavelength to four or more wavelengths, and a second light receiving portion to receive the light dispersed by the spectroscopic element and capture a spectroscopic image of each wavelength dispersed by the spectroscopic element; The first imaging condition setting portion sets a first imaging condition for the first camera. The second imaging condition setting portion sets a second imaging condition for the second camera based on the first imaging condition.

8 Claims, 6 Drawing Sheets

(51) Int. Cl.
*H04N 13/15* (2018.01)
*H04N 13/00* (2018.01)

(58) Field of Classification Search
CPC .. H04N 5/23216; H04N 5/2353; H04N 5/247; H04N 9/045; H04N 23/10; H04N 23/60; H04N 23/62; H04N 23/73; H04N 23/90
USPC .......................................................... 348/47
See application file for complete search history.

(56) References Cited

U.S. PATENT DOCUMENTS

| | | | |
|---|---|---|---|
| 2014/0340515 A1* | 11/2014 | Tanaka | H04N 7/18 |
| | | | 382/199 |
| 2020/0193597 A1* | 6/2020 | Fan | A61B 5/7275 |
| 2021/0144287 A1* | 5/2021 | Takashima | G03B 7/097 |

FOREIGN PATENT DOCUMENTS

| | | |
|---|---|---|
| CN | 108322670 A | 7/2018 |
| JP | 2015502058 A | 1/2015 |

\* cited by examiner

FIG. 5

| CORRECTION COEFFICIENT ITEM | CORRECTION COEFFICIENT | | | | | | |
|---|---|---|---|---|---|---|---|
| | 700nm | 680nm | 660nm | ... | $\lambda$x | ... | 400nm |
| EXPOSURE CORRECTION COEFFICIENT | $\beta t\_700$ | $\beta t\_680$ | $\beta t\_660$ | ... | $\beta t\_\lambda x$ | ... | $\beta t\_400$ |
| APERTURE CORRECTION COEFFICIENT | $\beta a\_700$ | $\beta a\_680$ | $\beta a\_660$ | ... | $\beta a\_\lambda x$ | ... | $\beta a\_400$ |
| ISO CORRECTION COEFFICIENT | $\beta i\_700$ | $\beta i\_680$ | $\beta i\_660$ | ... | $\beta i\_\lambda x$ | ... | $\beta i\_400$ |

FIG. 6

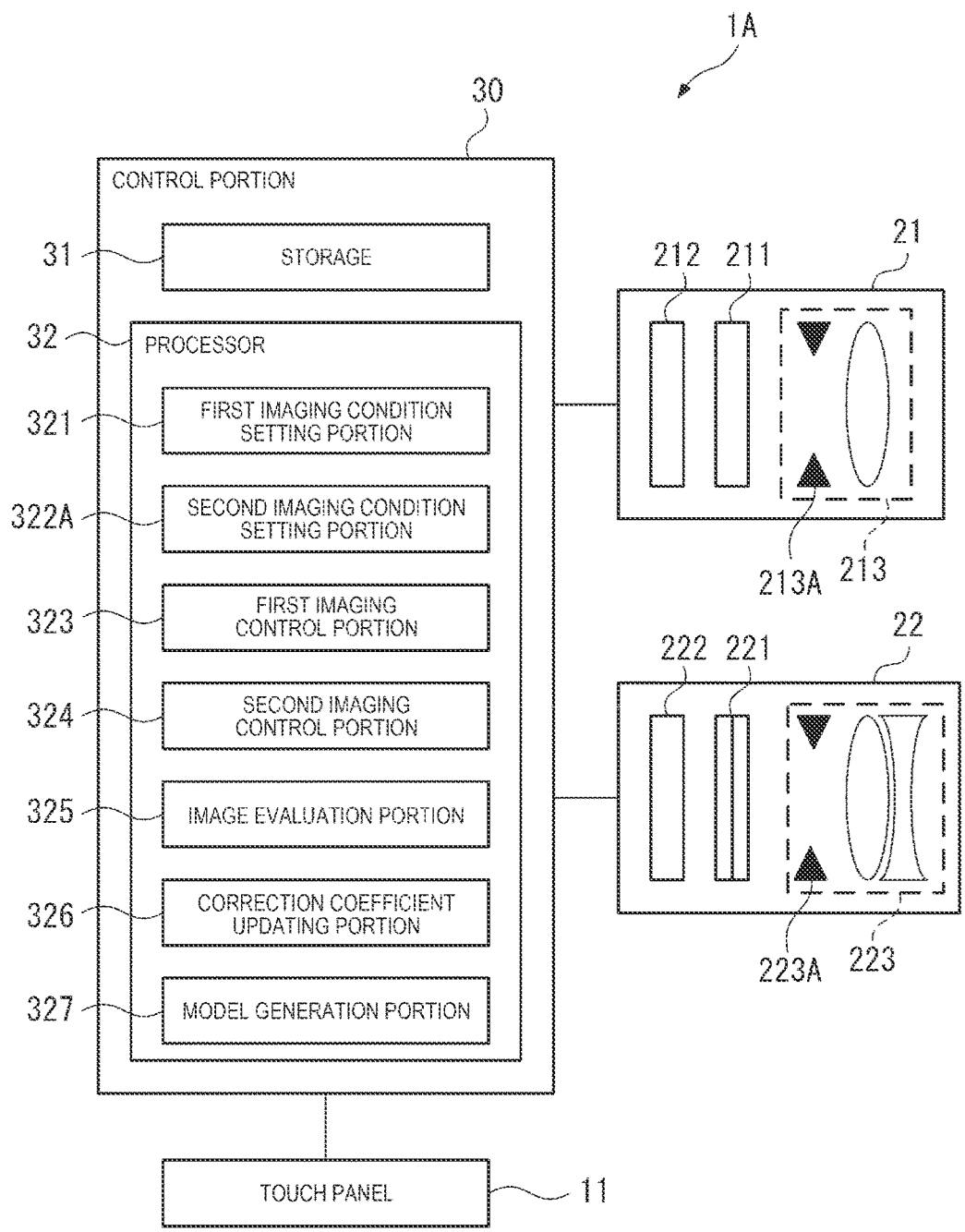

IMAGING APPARATUS, PORTABLE TERMINAL APPARATUS, AND IMAGING METHOD

The present application is based on, and claims priority from JP Application Serial Number 2020-092970, filed May 28, 2020, the disclosure of which is hereby incorporated by reference herein in its entirety.

BACKGROUND

1. Technical Field

The present disclosure relates to an imaging apparatus, a portable terminal apparatus, and an imaging method.

2. Related Art

In related art, an imaging apparatus including an RGB camera for capturing a color image and a spectroscopic camera for capturing a spectroscopic image, is known (see, for example, JP-T-2015-502058).

The imaging apparatus described in JP-T-2015-502058 is an imaging system including an RGB sensor which is an RGB camera and a NIR sensor which is a spectroscopic camera. In such an imaging system, the spectroscopic image captured by the NIR sensor can be superimposed and displayed on the color image captured by the RGB sensor.

However, in an imaging apparatus including an RGB camera and a spectroscopic camera as described in JP-T-2015-502058, there is a problem in which convenience is impaired because it is usually necessary to individually set the imaging condition of the RGB camera and the imaging condition of the spectroscopic camera.

In particular, in order to set the imaging condition of the spectroscopic camera, there is a problem in which it is necessary that a predetermined calibration target object is captured by the spectroscopic camera at a plurality of wavelengths and each of the imaging conditions is set for each wavelength based on each spectroscopic image obtained by the imaging, the setting task of the imaging condition is complicated, and the user also needs to have specialized knowledge.

SUMMARY

An imaging apparatus according to a first aspect includes a first camera which includes a color filter portion including a red color filter that transmits light in a red wavelength region, a green color filter that transmits light in a green wavelength region, and a blue color filter that transmits light in a blue wavelength region, and a first light receiving portion receiving light transmitted through the color filter portion, and which captures a color image based on a gradation value of red light transmitted through the red color filter, a gradation value of green light transmitted through the green color filter, and a gradation value of blue light transmitted through the blue color filter, a second camera which includes a spectroscopic element configured to disperse light having a predetermined spectral wavelength from incident light and to change the spectral wavelength to four or more wavelengths, and a second light receiving portion receiving the light dispersed by the spectroscopic element, and which captures a spectroscopic image of each wavelength dispersed by the spectroscopic element, a first imaging condition setting portion which sets a first imaging condition which is an imaging condition of the first camera, and a second imaging condition setting portion which sets a second imaging condition, which is an imaging condition of the second camera, based on the first imaging condition.

A portable terminal apparatus according to a second aspect includes the imaging apparatus of the first aspect as described above and a housing in which the imaging apparatus is incorporated.

An imaging method according to a third aspect is an imaging method of an imaging apparatus including a first camera which includes a color filter portion including a red color filter that transmits light in a red wavelength region, a green color filter that transmits light in a green wavelength region, and a blue color filter that transmits light in a blue wavelength region, and a first light receiving portion receiving light transmitted through the color filter portion, and which captures a color image based on a gradation value of red light transmitted through the red color filter, a gradation value of green light transmitted through the green color filter, and a gradation value of blue light transmitted through the blue color filter, and a second camera which includes a spectroscopic element configured to disperse light having a predetermined spectral wavelength from incident light and to change the spectral wavelength to four or more wavelengths, and a second light receiving portion receiving the light dispersed by the spectroscopic element, and which captures a spectroscopic image of each wavelength dispersed by the spectroscopic element, including setting a first imaging condition which is an imaging condition of the first camera, and setting a second imaging condition, which is an imaging condition of the second camera, based on the first imaging condition.

BRIEF DESCRIPTION OF THE DRAWINGS

FIG. 5 is a diagram illustrating an overview of a correction coefficient of a third embodiment.

FIG. 6 is a block diagram illustrating a schematic configuration of an electronic device according to a fourth embodiment.

DESCRIPTION OF EXEMPLARY EMBODIMENTS

First Embodiment

Hereinafter, a first embodiment will be described.

Figure 1:
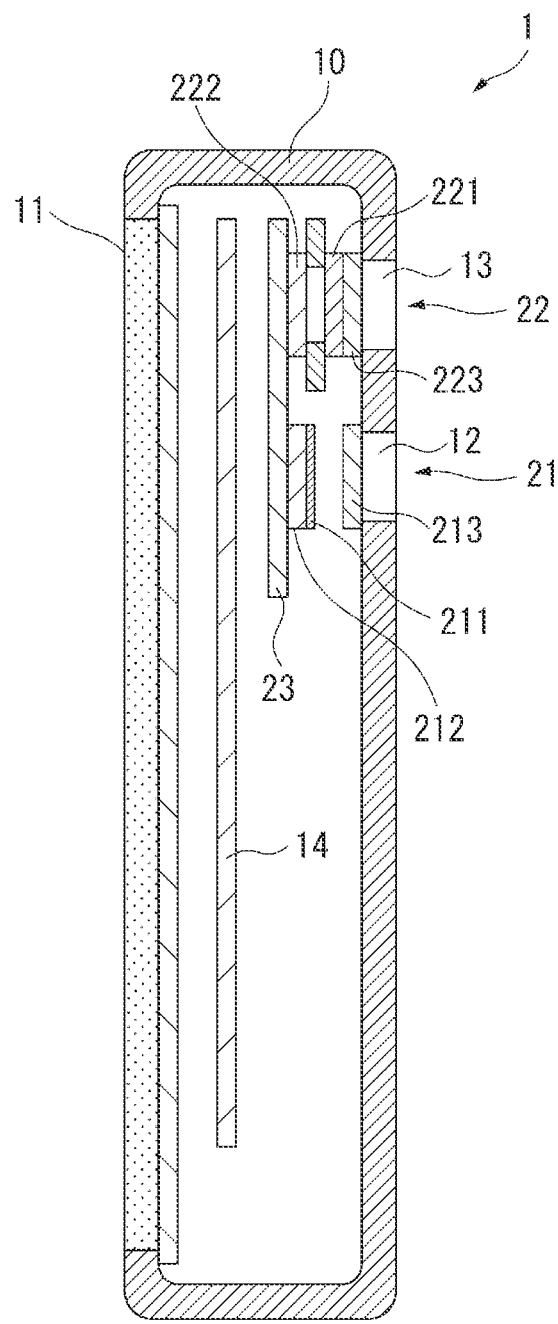
FIG. 1 is a side sectional view illustrating a schematic configuration of an electronic device according to a first embodiment.
Figure 2:
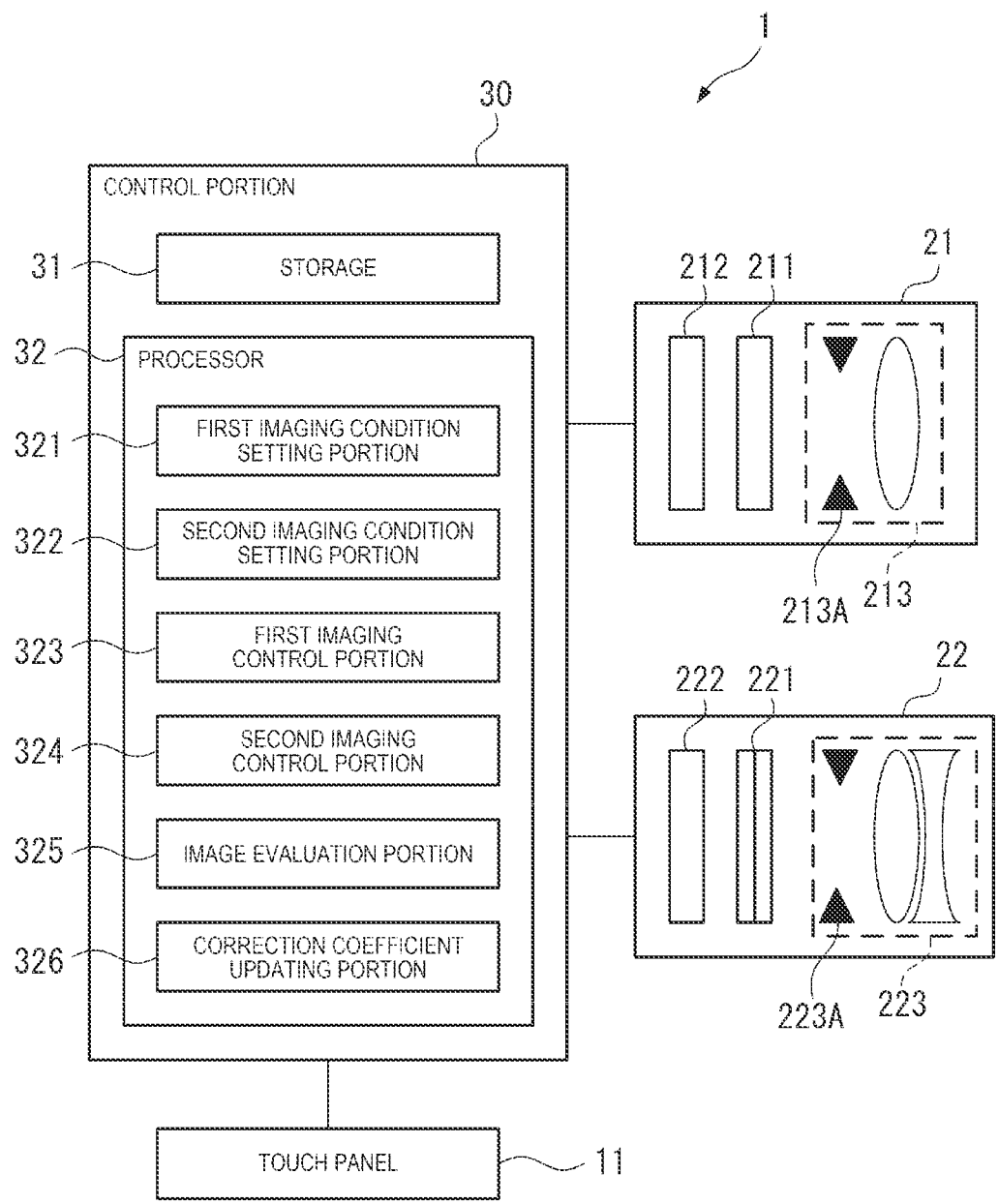
FIG. 2 is a block diagram illustrating a schematic configuration of the electronic device according to the first embodiment.

FIG. 1 is a view illustrating an example of an electronic device 1 of the present embodiment, and is a side sectional view illustrating a schematic configuration of the electronic device 1. FIG. 2 is a block diagram illustrating a schematic configuration of the electronic device 1. The electronic device 1 is a portable terminal apparatus that can be carried by a user, and for example, a smartphone, a tablet terminal, a mobile phone, a head-mounted display, or the like can be exemplified.

In the present embodiment, a smartphone is exemplified as an example of the electronic device 1. As illustrated in FIG. 1, the electronic device 1 includes a housing 10, a first camera 21 disposed inside the housing 10, a second camera 22, and a control portion 30 (see FIG. 2). The first camera 21, the second camera 22, and the control portion 30 constitute the imaging apparatus according to the present disclosure.

The housing 10 is formed in a thin box shape, for example, and is provided with a touch panel 11 on one side, which displays an image and accepts an input operation from a user. In addition to the touch panel 11, the electronic device 1 may include an input button or the like that accepts an input operation from the user.

Further, a first window 12 and a second window 13 are provided on a surface opposite to the surface on which the touch panel 11 of the housing 10 is provided. The first window 12 is provided to face the first camera 21, and a second window 13 is provided to face the second camera 22.

Further, the electronic device 1 may include a light source or the like that irradiates a target object with illumination light when the first camera 21 and the second camera 22 capture the target object, and may be provided with a light amount detection sensor or the like for automatically setting a first imaging condition which is an imaging condition by the first camera 21.

Configuration of First Camera 21 and Second Camera 22

The first camera 21 is an RGB camera disposed to face the first window 12. The RGB camera is a camera for imaging a color image which is widely used in a portable terminal such as a general smartphone.

The first camera 21 includes a color filter portion 211, a first light receiving portion 212, and a first imaging optical system 213.

The color filter portion 211 includes a red color filter (R filter) which transmits light in the red wavelength region, a green color filter (G filter) which transmits light in the green wavelength region, and a blue color filter (B filter) which transmits light in the blue wavelength region. In the following description, the R filter, the G filter, and the B filter may be collectively referred to as a color filter. A plurality of these R filters, G filters, and B filters are provided, and for example, is disposed in a Bayer array.

The first light receiving portion 212 is an imaging element constituted with a general charge-coupled device (CCD) sensor and a complementary metal oxide semiconductor (CMOS) sensor. The first light receiving portion 212 has an imaging pixel corresponding to each color of the color filter portion 211, and receives light transmitted through the corresponding color filter.

The first light receiving portion 212, for example, acquires an RGB gradation value for one pixel of image data by receiving light transmitted through one R filter, one B filter, and two G filters at the imaging pixel corresponding to each filter. Accordingly, the first camera 21 acquires the RGB gradation value of each pixel of the image data from each imaging pixel of the first light receiving portion 212 to generate a color image.

The first imaging optical system 213 is an optical system which guides the light incident from the first window 12 to the first light receiving portion 212, and is constituted with, for example, a plurality of lenses or the like. Further, as illustrated in FIG. 2, the first imaging optical system 213 is provided with a first aperture mechanism 213A capable of adjusting the incident range of the light incident on the first light receiving portion 212, and adjusts the light receiving amount of the first light receiving portion 212 by adjusting the incident range.

The second camera 22 is a spectroscopic camera disposed to face the second window 13, and captures each spectroscopic image for a plurality of wavelengths.

The second camera 22 includes a spectroscopic element 221, a second light receiving portion 222, and a second imaging optical system 223.

The spectroscopic element 221 is an element capable of spectroscopically transmitting light having a predetermined spectral wavelength from incident light and switching the spectral wavelength to be dispersed to an optional wavelength. In the present embodiment, the spectroscopic element 221 uses a variable wavelength Fabry-Perot element provided with a pair of reflective films facing each other and an electrostatic actuator which changes the gap between the pair of reflective films by applying a voltage. The spectroscopic element 221 using such a variable wavelength Fabry-Perot element can be made smaller and thinner in element size, and can be suitably incorporated particularly for an electronic device 1 having a limited disposition space such as a portable terminal apparatus.

The spectroscopic element 221 is not limited to the Fabry-Perot element as described above, and for example, acousto-optic tunable filter (AOTF), liquid crystal tunable filter (LCTF), or the like may be used.

The spectroscopic element 221 of the present embodiment can switch the spectral wavelength of the transmitted light into four or more wavelengths, and can capture an image in which the color of a target object can be analyzed with higher accuracy than in the first camera 21 which captures a color image in three colors of RGB, in the visible light region.

The second light receiving portion 222 is provided on the same substrate as a camera substrate 23 on which the first light receiving portion 212 is provided. In the example of FIG. 1, the first light receiving portion 212 and the second light receiving portion 222 are disposed on the same camera substrate 23, but the circuit substrate provided with the first light receiving portion 212 and the circuit substrate provided with the second light receiving portion 222 may be separate bodies.

Like the first light receiving portion 212, the second light receiving portion 222 is an imaging element constituted with a general charge-coupled device (CCD) sensor and a complementary metal oxide semiconductor (CMOS) sensor. That is, the second light receiving portion 222 has a plurality of imaging pixels, and each imaging pixel outputs an electric signal according to the intensity of the received light. Accordingly, the second camera 22 generates a spectroscopic image in which the light intensity value output from each imaging pixel is the data of one pixel. A general RGB camera such as the first light receiving portion 212 interpolates data from the data of a peripheral pixel, and for example, in the pixel corresponding to the R filter, calculates blue and green data from the data of the pixels corresponding to the peripheral B filter and G filter. On the other hand, the second light receiving portion 222 which is a spectroscopic camera can directly acquire data for a plurality of wavelengths at each pixel, so that the above interpolation is unnecessary and the high-definition vivid image can be generated compared to a general RGB camera.

The second imaging optical system 223 is an optical system which guides the light incident from the second window 13 to the second light receiving portion 222, and is constituted with, for example, a plurality of lenses. Further, as illustrated in FIG. 2, the second imaging optical system 223 is provided with a second aperture mechanism 223A capable of adjusting the incident range of the light incident on the second light receiving portion 222, and adjusts the light receiving amount of the second light receiving portion 222 by adjusting the incident range. In FIGS. 1 and 2, an example is illustrated in which the second imaging optical system 223 is provided on the side opposite to the second light receiving portion 222 of the spectroscopic element 221, but an optical component such as a lens constituting the second imaging optical system 223 may also be provided between the spectroscopic element 221 and the second light receiving portion 222.

Configuration of Control Portion 30

The control portion 30 is constituted with various electronic circuits such as a central processing unit (CPU) mounted on a main board 14 disposed inside the housing 10 and a semiconductor memory, and includes a storage 31 and a processor 32.

The storage 31 is constituted with, for example, a semiconductor memory or the like, and stores various programs and various data. The storage 31 functions as a correction coefficient recording portion according to the present disclosure, and stores a correction coefficient β for setting the second imaging condition. The correction coefficient β will be described later.

The processor 32 executes various processing in the electronic device 1 by reading and executing the program stored in the storage 31. Specifically, the processor 32 functions as a first imaging condition setting portion 321, a second imaging condition setting portion 322, a first imaging control portion 323, a second imaging control portion 324, an image evaluation portion 325, and a correction coefficient updating portion 326.

The first imaging condition setting portion 321 acquires the first imaging condition which is the imaging condition of the first camera when performing the imaging processing using the first camera 21. The first imaging condition includes an exposure time (shutter speed), an aperture value (F value), a focus distance, an ISO sensitivity, or the like. The first imaging condition setting portion 321 automatically sets the first imaging condition based on the distance and brightness (light receiving amount) from the first light receiving portion 212 to the imaging target object. Further, the first imaging condition can be appropriately changed by the operation of the user, and for example, when the user inputs the first imaging condition from the touch panel 11, the first imaging condition setting portion 321 sets the input first imaging condition.

The second imaging condition setting portion 322 sets the second imaging condition which is the imaging condition of the second camera 22 when performing the imaging processing using the second camera 22. The second imaging condition includes the exposure time, the aperture value, the focus distance, the ISO sensitivity, or the like, as in the first imaging condition. The second imaging condition setting portion 322 sets the second imaging condition based on the first imaging condition set by the first imaging condition setting portion 321. That is, the second imaging condition setting portion 322 corrects the first imaging condition by using the correction coefficient β stored in the storage 31 to obtain the second imaging condition. More detailed processing of the second imaging condition setting portion 322 will be described later.

The first imaging control portion 323 controls the first camera 21 based on the first imaging condition, and causes the first camera 21 to image a color image (RGB image).

The second imaging control portion 324 controls the second camera 22 based on the second imaging condition, and causes the second camera 22 to image a spectroscopic image for a plurality of spectral wavelengths.

The image evaluation portion 325 evaluates whether the spectroscopic image of each wavelength captured by the second camera 22 is an appropriate spectroscopic image. For example, the image evaluation portion 325 determines whether each spectroscopic image causes halation, in other words, whether each imaging pixel of the second light receiving portion 222 receives light exceeding the detectable light amount. Specifically, in the spectroscopic image, it is determined whether the gradation value is not the maximum value in a predetermined number or more (for example, one or more) of pixels.

The image evaluation portion 325 may determine whether the gradation value of each pixel is within a predetermined reference range in the spectroscopic image of each wavelength when a predetermined test target is imaged. The test target may include, for example, a white reference plate or the like having a reflectance of 99% or more with respect to light of each wavelength. In this case, the image evaluation portion 325 can evaluate not only the presence or absence of the halation but also whether the S/N ratio of the spectroscopic image is appropriate.

The correction coefficient updating portion 326 updates the correction coefficient when setting the second imaging condition based on the evaluation result of the image evaluation portion 325. That is, in the evaluation result by the image evaluation portion 325, the correction coefficient is updated so that halation does not occur in the spectroscopic image.

Imaging Method in Electronic Device 1

Next, an imaging method in the electronic device 1 incorporating the imaging apparatus as described above will be described.

In the electronic device 1 of the present embodiment, imaging processing in a plurality of imaging modes can be performed such as imaging processing of the color image using the first camera 21, imaging processing of the spectroscopic image using the second camera 22, and imaging processing of the color image and the spectroscopic image using both the first camera 21 and the second camera 22. When imaging processing of both the color image and the spectroscopic image are performed, the spectroscopic image can be superimposed on the color image and displayed on the touch panel 11, or the result from performing analysis processing based on the spectroscopic image (for example, component analysis or the like) can be superimposed on the color image and displayed on the touch panel 11.

Here, imaging processing of the color image using the first camera 21 is the same as the imaging processing in related art by a general smartphone or the like.

That is, when the user operates the touch panel 11 or the like to select an application for capturing a color image, the control portion 30 activates the first camera 21. Further, the first imaging condition setting portion 321 automatically sets the first imaging condition such as the exposure time, the aperture value, the focus distance, and the ISO sensitivity based on the light receiving amount of light received by the first light receiving portion 212 and the distance to the target object. When it is input to change the first imaging condition by the input operation of the user, the first imaging condition set and input by the user may be acquired.

As described above, after the first imaging condition is set by the first imaging condition setting portion 321, the imaging command for commanding imaging is input by the input operation of the user, so that the first imaging control portion 323 controls the first camera 21 to capture a color image.

On the other hand, when performing the imaging processing of the spectroscopic image, the electronic device 1 of the present embodiment sets the second imaging condition based on the first imaging condition. Hereinafter, the imaging processing of the spectroscopic image will be described in detail.

Figure 3:
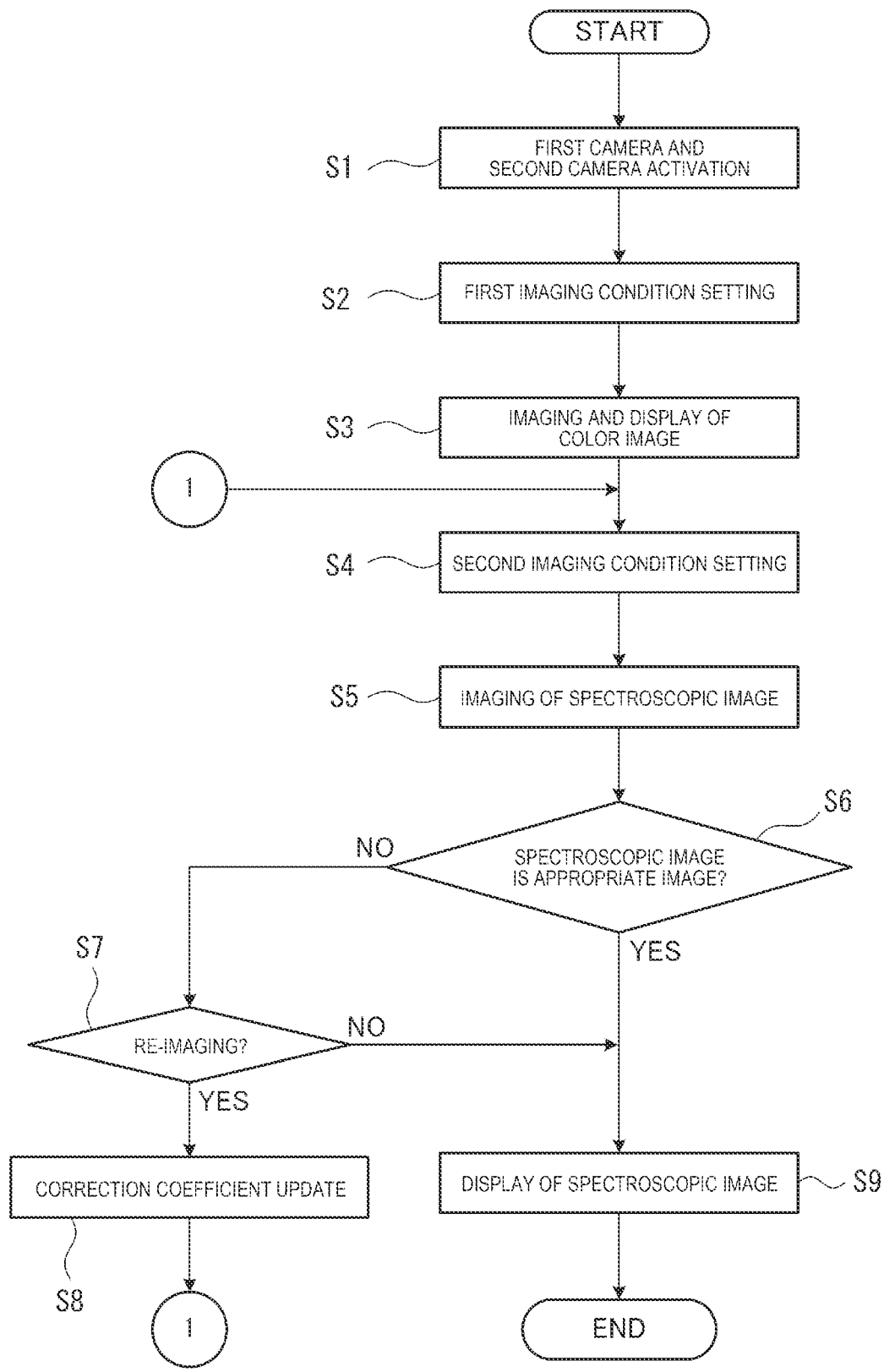
FIG. 3 is a flowchart illustrating an imaging method of a spectroscopic image of the first embodiment.

FIG. 3 is a flowchart illustrating an imaging method of a spectroscopic image of the present embodiment.

In the present embodiment, when the user operates the touch panel 11 or the like to select an application for capturing a spectroscopic image, the control portion 30 activates the first camera 21 and the second camera 22 (step S1).

After that, the first imaging condition setting portion 321 sets the first imaging condition of the first camera 21 (step S2). This step S2 is the same as the setting of the first imaging condition performed in the imaging processing of the color image by the first camera 21 described above. That is, the first imaging condition setting portion 321 automatically sets the first imaging condition such as the exposure time, the aperture value, the focus distance, and the ISO sensitivity based on the light receiving amount of light received by the first light receiving portion 212 and the distance to the target object, or sets the first imaging condition input by the user.

Further, the first imaging control portion 323 images a color image of the target object by the first camera 21 based on the first imaging condition and displays the color image on the touch panel 11 (step S3). That is, the real-time image of the target object is displayed on the touch panel 11. Accordingly, the user can adjust the imaging position of the spectroscopic image while checking the target object which is the subject.

Further, the second imaging condition setting portion 322 sets the second imaging condition based on the first imaging condition (step S4).

Here, in the present embodiment, the correction coefficient $\beta$ is recorded in the storage 31. The correction coefficient $\beta$ includes an exposure correction coefficient $\beta t$ for the exposure time, an aperture correction coefficient $\beta a$ for the aperture value, and an ISO correction coefficient $\beta i$ for the ISO sensitivity.

The second imaging condition setting portion 322 multiplies an exposure time $T_1$, which is the first imaging condition, by the exposure correction coefficient $\beta t$, to set an exposure time $T_2$ ($=T_1 \times \beta t$) of the second imaging condition. Similarly, the second imaging condition setting portion 322 multiplies an aperture value $A_1$, which is the first imaging condition, by the aperture correction coefficient $\beta a$, to set an aperture value $A_2$ ($=A_1 \times \beta a$) of the second imaging condition. Similarly, the second imaging condition setting portion 322 multiplies an ISO sensitivity $I_1$, which is the first imaging condition, by the ISO correction coefficient $\beta i$, to set an ISO sensitivity $I_2$ ($=I_1 \times \beta i$) of the second imaging condition.

In the present embodiment, each of the initial value of the correction coefficient $\beta$ and the update value are stored, and in the step S4, which is initially executed after the application is executed in the step S1, the initial value of the correction coefficient $\beta$ is used, and in the second and subsequent steps S4, the update value of the correction coefficient $\beta$ is used. That is, in the present embodiment, the correction coefficient $\beta$ is sequentially updated by the correction coefficient updating portion 326, so that the second imaging condition is optimized every time a spectroscopic image is captured.

The initial value of the correction coefficient $\beta$ is set based on the light receiving sensitivity characteristic of the second light receiving portion 222 and the spectral characteristic of the spectroscopic element. When the electronic device 1 includes a light source portion that irradiates a target object with illumination light, it is set based on the light receiving sensitivity characteristic of the second light receiving portion 222, the spectral characteristic of the spectroscopic element 221, and the light source characteristic of the light source portion.

Figure 4:
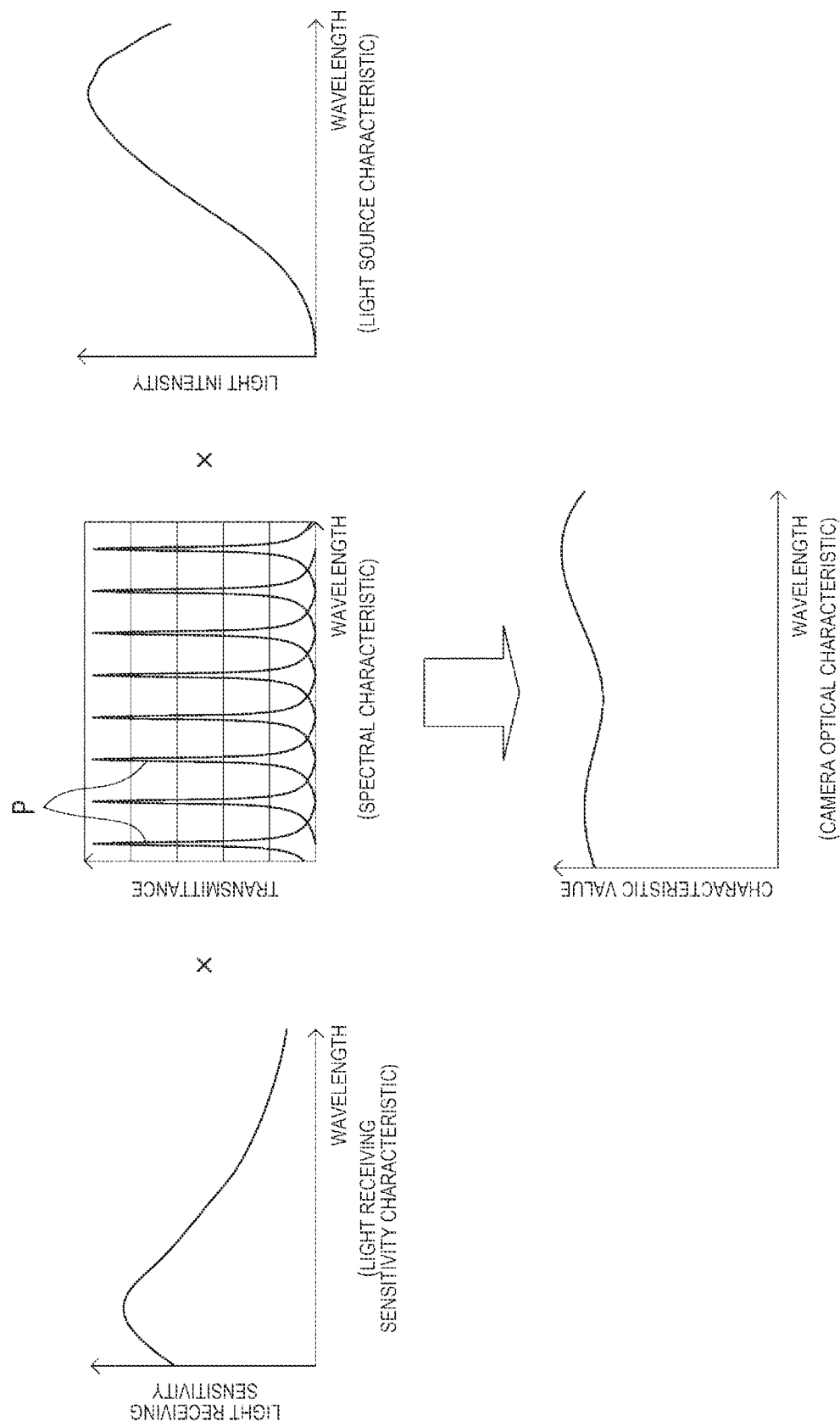
FIG. 4 is a diagram illustrating a light receiving sensitivity characteristic of a second light receiving portion, a spectral characteristic of a spectroscopic element, a light source characteristic of a light source, and a camera optical characteristic of a second camera obtained by multiplying these previous characteristics, in the first embodiment.

FIG. 4 is a diagram illustrating the light receiving sensitivity characteristic, the spectral characteristic, the light source characteristic, and the characteristic of the second camera (hereinafter referred to as a camera optical characteristic) obtained by multiplying these previous characteristics.

The light receiving sensitivity characteristic of the second light receiving portion 222 is a characteristic indicating the sensitivity of the second light receiving portion to each wavelength.

The spectral characteristic of the spectroscopic element 221 is a characteristic indicating the transmittance of light of each wavelength when a predetermined spectral wavelength is transmitted by the spectroscopic element 221. Here, the spectroscopic element 221 can change the wavelength of the transmitted light within a predetermined wavelength range, and the transmittance characteristic when the spectroscopic element 221 transmits the light of a predetermined spectral wavelength, exhibits that the transmittance peaks at the corresponding spectral wavelength as illustrated in a line P of FIG. 4.

The light source characteristic is a characteristic indicating the light amount (light intensity) of each wavelength of the illumination light.

The camera characteristic value is a characteristic obtained by multiplying these light receiving sensitivity characteristic, spectral characteristic, and light source characteristic.

In the present embodiment, the initial value of the correction coefficient $\beta$ is set based on the maximum characteristic value in the camera optical characteristic as described above. That is, when a spectroscopic image of a wavelength $\lambda_M$ having the maximum characteristic value is captured by the second camera 22, a correction coefficient $\beta$ in which the gradation value of each pixel is less than the maximum gradation value, is set. Accordingly, it is possible to image a spectroscopic image in which the occurrence of halation is suppressed for any spectral wavelength.

Returning to FIG. 3, after the step S4, the second imaging control portion 324 controls the second camera 22 to capture a spectroscopic image (step S5). At this time, the first camera 21 may be controlled to simultaneously image a color image.

Specifically, the second imaging control portion 324 sets the wavelength of the light transmitted from the spectroscopic element 221 to the designated spectral wavelength, and adjusts the second aperture mechanism 223A based on the aperture value $A_2$ of the second imaging condition. The second imaging control portion 324 detects the light receiving amount of light in the second light receiving portion 222 at the exposure time $T_2$ of the second imaging condition, and amplifies a light receiving signal according to the light receiving amount output from each imaging element based on the ISO sensitivity $I_2$ of the second imaging condition. Accordingly, a spectroscopic image based on the second imaging condition is captured.

When capturing a spectroscopic image of a plurality of wavelengths on a target object, the wavelength of the light transmitted from the spectroscopic element are sequentially switched, and imaging processing of the spectroscopic image may be performed by the second camera 22 according to the second imaging condition in the same manner as above.

After that, the image evaluation portion 325 determines whether the spectroscopic image captured in the step S5 is an appropriate image (step S6). That is, the image evaluation portion 325 determines whether the gradation value of each pixel in the spectroscopic image for each spectral wavelength is less than the preset maximum gradation value.

In the spectroscopic image, when there is a pixel whose gradation value has the maximum gradation value, there is a possibility that light exceeding the light receiving amount that can be detected by the second light receiving portion 222 is received. In such a case, in the present embodiment, it is determined that halation has occurred.

If it is determined as NO in the step S6, the second imaging control portion 324 determines whether to perform re-imaging by the second camera 22 (step S7). For example, when re-imaging is instructed by the input operation of a user, YES may be determined in the step S7. Further, when the re-imaging try setting number is set in advance and the number of times continuously determined as NO in the step S6 becomes the re-imaging try setting number which has been set, it may be determined as NO in the step S7, and when the number of times continuously determined as NO is less than the re-imaging try setting number, it may be determined as YES in the step S7.

When it is determined as NO in the step S6 and it is determined as YES in the step S7 due to the occurrence of halation or the like, the correction coefficient updating portion 326 updates the update value of the correction coefficient β stored in the storage 31 (step S8). After the step S4 is executed for the first time, the correction coefficient updating portion 326 calculates a new correction coefficient β from the initial value of the correction coefficient β to record the new correction coefficient as an update value. After the step S4 is executed for the second time, a new correction coefficient β is calculated from the update value of the previous correction coefficient β to update the update value.

As a method of calculating the correction coefficient β which is the update value, for example, the correction coefficient updating portion 326 may calculate the update value by subtracting a preset value from the correction coefficient β used in the step S4 and may calculate the update value by multiplying a predetermined value less than 1. Further, the correction coefficient updating portion 326 may change the amount of decrease in the correction coefficient β according to the number of pixels causing halation.

Further, the correction coefficient updating portion 326 may update only one or two of the exposure correction coefficient βt, the aperture correction coefficient βa, and the ISO correction coefficient βi. For example, only the exposure correction coefficient βt may be updated, or the exposure correction coefficient βt and the aperture correction coefficient βa may be updated.

After the step S8, the processing returns to the step S4, the second imaging condition setting portion 322 resets the second imaging condition based on the updated correction coefficient β, and the second imaging control portion 324 causes the second camera 22 to capture a spectroscopic image based on the second imaging condition.

Further, when it is determined as YES in the step S6 and it is determined as NO in the step S7, the electronic device 1 displays the spectroscopic image captured by the second camera 22 on the touch panel 11 (step S9).

The display method of the spectroscopic image is performed based on the imaging mode selected by the user, and for example, only the spectroscopic image may be displayed on the touch panel 11, or the spectroscopic image may be superimposed on the color image and displayed. Alternatively, the analysis result analyzed based on the spectroscopic image may be superimposed on the color image and displayed.

Working Effect of Present Embodiment

The electronic device 1 of the present embodiment includes an imaging apparatus constituted with the first camera 21, the second camera 22, and the control portion 30. The first camera 21 includes a color filter portion 211 including the R filter which transmits light in the red wavelength region, the G filter which transmits light in the green wavelength region, and the B filter which transmits light in the blue wavelength region, and the first light receiving portion 212 which receives light transmitted through the color filter portion 211. The first camera 21 captures a color image based on the gradation value of red light transmitted through the R filter, the gradation value of green light transmitted through the G filter, and the gradation value of blue light transmitted through the B filter. The second camera 22 includes the spectroscopic element 221 capable of dispersing light having a predetermined spectral wavelength from the incident light and changing the spectral wavelength to four or more wavelengths, and the second light receiving portion 222 that receives the light dispersed by the spectroscopic element 221. The second camera 22 captures a spectroscopic image of each wavelength dispersed by the spectroscopic element 221. The control portion 30 includes the storage 31 and the processor 32, and the processor 32 reads and executes a program stored in the storage 31 to function as the first imaging condition setting portion 321, the second imaging condition setting portion 322, or the like. The first imaging condition setting portion 321 sets the first imaging condition, which is the imaging condition of the first camera 21. The second imaging condition setting portion 322 sets the second imaging condition, which is the imaging condition of the second camera 22, based on the first imaging condition.

In such an embodiment, the user does not need to set the second imaging condition by himself/herself with respect to the second camera 22 which captures the spectroscopic image, and the user is not required to have specialized knowledge, either. Accordingly, it is possible to improve the convenience when using the second camera 22 by the electronic device 1. Further, since the second imaging condition is set based on the first imaging condition, it is not necessary to perform a preliminary operation for capturing a spectroscopic image a plurality of times to set the second imaging condition, or the like, and it is possible to quickly set the second imaging condition.

In the electronic device 1 of the present embodiment, the second imaging condition setting portion 322 sets at least the exposure time as the second imaging condition.

When the second light receiving portion 222 receives light and the light receiving amount exceeds the permissible value, halation occurs in the spectroscopic image, and an appropriate spectroscopic image cannot be captured. The exposure time is most related to the occurrence of such halation, and in the present embodiment, the image abnormality due to halation can be effectively suppressed by appropriately setting the second imaging condition including the exposure time $T_2$.

In the electronic device 1 of the present embodiment, the second imaging condition setting portion 322 sets the second imaging condition by multiplying the first imaging condition by the correction coefficient β.

Accordingly, the second imaging condition setting portion 322 can easily set the second imaging condition by simple processing of only multiplying the first imaging condition by the correction coefficient β, and the time required to image the spectroscopic image can be shortened.

In the electronic device 1 of the present embodiment, the correction coefficient β is set based on the camera optical characteristic obtained by multiplying a spectral characteristic indicating the transmittance of the spectroscopic element 221 for each spectral wavelength and a light receiving sensitivity characteristic indicating the light receiving sensitivity of the second light receiving portion 222 for each wavelength.

When a spectroscopic image is captured by using such camera optical characteristic, it is possible to specify the spectral wavelength at which the light receiving amount of the second light receiving portion 222 tends to exceed the permissible value, and it is possible to appropriately set the correction coefficient for calculating the second imaging condition capable of imaging an appropriate spectroscopic image at each spectral wavelength.

In the present embodiment, the correction coefficient β is set based on the maximum value of the characteristic value of the camera optical characteristic as described above.

In the camera optical characteristic, the wavelength at which the specific value becomes the maximum value is a wavelength at which halation is likely to occur in the captured spectroscopic image. Accordingly, when a correction coefficient is set so that halation does not occur at the corresponding wavelength, the occurrence of halation can be suppressed for each of the other spectral wavelengths.

The electronic device 1 of the present embodiment further includes the image evaluation portion 325 which evaluates a spectroscopic image obtained by imaging a target object with the second camera 22 under the second imaging condition, the storage 31 which records the correction coefficient β, and the correction coefficient updating portion which updates the update value of the correction coefficient β stored in the storage 31 based on the evaluation result by the image evaluation portion 325.

Accordingly, although there is an abnormality such as halation in the spectroscopic image captured under the second imaging condition using the initial value of the correction coefficient β which has been initially set, the correction coefficient updating portion 326 updates the correction coefficient β, so that it is possible to set the correction coefficient β capable of imaging an appropriate spectroscopic image. Accordingly, it is possible to capture an appropriate spectroscopic image in which halation or the like is not seen.

Second Embodiment

Next, the second embodiment will be described.

In the first embodiment, the initial correction coefficient β is set based on the wavelength of the maximum characteristic value in the camera optical characteristic of the second camera. On the other hand, the second embodiment differs from the first embodiment in that it is set based on the minimum characteristic value.

In the following descriptions, the descriptions of the matters already described will be omitted or simplified.

The electronic device 1 of the second embodiment has the same configuration as the configuration of the first embodiment, and as illustrated in FIGS. 1 and 2, includes the first camera 21, the second camera 22, the control portion 30, or the like.

Further, when the electronic device 1 of the second embodiment captures a spectroscopic image, the spectroscopic image is captured by the imaging method as illustrated in FIG. 3, substantially the same as the method of the first embodiment.

Here, in the present embodiment, the method of setting the initial correction coefficient β which is used by the second imaging condition setting portion 322 when setting the second imaging condition, is different from the method of the first embodiment.

That is, in the present embodiment, the initial value of the correction coefficient β is set based on the minimum value of the characteristic value among the camera optical characteristics of the second camera as illustrated in FIG. 4.

That is, when the spectroscopic element 221 disperses the light having the minimum characteristic value and images a spectroscopic image, the correction coefficient β is set so that the gradation value of each pixel of the spectroscopic image becomes equal to or higher than a preset threshold value. Accordingly, deterioration of the S/N ratio of each pixel of the spectroscopic image can be suppressed.

In this case, in the step S6, the image evaluation portion 325 evaluates whether a clear image is captured as a spectroscopic image. For example, the image evaluation portion 325 determines whether the maximum gradation value among the gradation values of each pixel of the spectroscopic image is equal to or greater than the threshold value.

When it is determined in the step S6 that the spectroscopic image is not appropriate (determined as NO), the correction coefficient updating portion 326 updates the correction coefficient β.

In this case, in the step S8, the correction coefficient updating portion 326 may calculate the update value of the correction coefficient β used in the step S4 by adding a preset value or multiplying the correction coefficient by a predetermined value greater than 1.

Working Effect of Second Embodiment

In the electronic device 1 of the present embodiment, the correction coefficient β is set based on the minimum value of the characteristic value of the camera optical characteristic.

By using the camera optical characteristic, it is possible to specify the spectral wavelength at which the light receiving amount of the second light receiving portion 222 tends to decrease when a spectroscopic image is captured. That is, in the camera optical characteristic, the wavelength at which the specific value becomes the minimum is the wavelength at which the gradation value of each pixel of the captured spectroscopic image is low and the image tends to be unclear (the S/N ratio tends to deteriorate). Accordingly, by setting a correction coefficient which suppresses the deterioration of the S/N ratio at the corresponding wavelength, the deterioration of the S/N ratio can be suppressed for each of the other spectral wavelengths.

Third Embodiment

Next, the third embodiment will be described.

In the first embodiment, three parameters of the exposure time $T_2$, the aperture value $A_2$, and the ISO sensitivity $I_2$, which are the second imaging conditions, are set based on the first imaging condition. On the other hand, the third embodiment is different from the first embodiment in that the second imaging condition is set independently for each spectral wavelength dispersed by the spectroscopic element 221.

FIG. 5 is a diagram illustrating an overview of the correction coefficient stored in the storage 31 in the third embodiment.

In the first embodiment, the exposure correction coefficient $\beta t$, the aperture correction coefficient $\beta a$, and the ISO correction coefficient $\beta i$ are recorded in the storage 31. On the other hand, in the present embodiment, as illustrated in FIG. 5, each of correction coefficients $\beta_{-\lambda}$ (an exposure correction coefficient $\beta t_{-\lambda}$, an aperture correction coefficient $\beta a_{-\lambda}$, and an ISO correction coefficient $\beta i_{-\lambda}$) is associated with each spectral wavelength which can be dispersed by the spectroscopic element 221, and is stored in the storage 31.

For example, an exposure correction coefficient $\beta t_{-400}$, an aperture correction coefficient $\beta a_{-400}$, and an ISO correction coefficient $\beta i_{-400}$ are associated with a wavelength of 400 nm, and an exposure correction coefficient $\beta t_{-700}$, an aperture correction coefficient $\beta a_{-700}$, and an ISO correction coefficient $\beta i_{-700}$ are associated with a wavelength of 700 nm.

These correction coefficients $\beta_{-\lambda}$ are set based on the camera optical characteristic of each wavelength.

That is, the initial value of the correction coefficient $\beta_{-\lambda}$ is set such that when a spectroscopic image of a spectral wavelength $\lambda$ is captured, the gradation value of each pixel of the spectroscopic image is set to be less than an upper limit value and greater than a predetermined threshold value.

In the present embodiment, in the step S4, the second imaging condition setting portion 322 sets each of the second imaging conditions for the spectral wavelengths of the spectroscopic image to be captured. For example, when the spectral wavelength of the spectroscopic image to be captured is $\lambda a$, the second imaging condition setting portion 322 reads a correction coefficient $\beta_{-\lambda a}$ corresponding to the wavelength $\lambda a$, that is, each of an exposure correction coefficient $\beta t_{-\lambda a}$, an aperture correction coefficient $\beta a_{-\lambda a}$, and an ISO correction coefficient $\beta i_{-\lambda a}$. The second imaging condition setting portion 322 uses the exposure time $T_1$ of the first imaging condition and the exposure correction coefficient $\beta t_{-\lambda a}$ and calculates an exposure time $T_{2\_\lambda a}$ of the second imaging condition with respect to the spectral wavelength $\lambda a$ by $T_{2\_\lambda a} = T_1 \times \beta t_{-\lambda a}$. Similarly, the second imaging condition setting portion 322 uses an aperture value $A_1$ of the first imaging condition and the aperture correction coefficient $\beta a_{-\lambda a}$ and calculates an aperture value $A_{2\_\lambda a}$ of the second imaging condition with respect to the spectral wavelength $\lambda a$ by $A_{2\_\lambda a} = A_1 \times \beta a_{-\lambda a}$. Similarly, the second imaging condition setting portion 322 uses an ISO sensitivity $I_1$ of the first imaging condition and the ISO correction coefficient $\beta i_{-\lambda a}$ and calculates an ISO sensitivity $I_{2\_\lambda a}$ of the second imaging condition with respect to the spectral wavelength $\lambda a$ by $I_{2\_\lambda a} = I_1 \times \beta i_{-\lambda a}$.

Accordingly, when a spectroscopic image is captured for a plurality of spectral wavelengths, the second imaging condition setting portion 322 sets each of the second imaging conditions for each spectral wavelength.

Further, in the present embodiment, in the step S6, the image evaluation portion 325 determines whether each spectroscopic image is appropriate, and for a spectral wavelength determined to be inappropriate, the update of the correction coefficient $\beta$ is performed by the correction coefficient updating portion 326 in the step S8.

For example, when halation occurs in the spectroscopic image of 400 nm, the brightness is insufficient in the spectroscopic image of 550 nm, and the spectroscopic image is determined to be appropriate in the spectroscopic image of 700 nm, the correction coefficient updating portion 326 calculates an update value obtained by reducing a correction coefficient $\beta_{-400}$ by a predetermined correction amount, calculates an update value obtained by increasing a correction coefficient $\beta_{-550}$ by a predetermined correction amount, and does not update a correction coefficient $\beta_{-700}$.

Working Effect of Third Embodiment

In the electronic device 1 of the present embodiment, the second imaging condition setting portion 322 sets the second imaging condition for every spectral wavelength based on each of the correction coefficients $\beta_{-\lambda s}$ which is set for each spectral wavelength which can be changed by the spectroscopic element 221.

That is, instead of using a common second imaging condition for a plurality of spectral wavelengths, a different correction coefficient is set for every spectral wavelength, and a second imaging condition for every spectral wavelength is set based on the corresponding correction coefficient. Accordingly, the probability that an abnormality such as halation will occur in the spectroscopic image is reduced, and an appropriate spectroscopic image can be captured.

Fourth Embodiment

Next, the fourth embodiment will be described.

In the first embodiment, the correction coefficient updating portion 326 updates the correction coefficient stored in the storage 31 based on the evaluation result of the spectroscopic image by the image evaluation portion 325. On the other hand, the fourth embodiment is different from the first embodiment in that a model for calculating the correction coefficient is generated based on the evaluation result of the spectroscopic image by the image evaluation portion 325.

FIG. 6 is a block diagram illustrating a schematic configuration of an electronic device 1A according to the present embodiment.

The processor 32 of the present embodiment reads and executes the program stored in the storage 31, thereby, as illustrated in FIG. 6, functioning as the first imaging condition setting portion 321, a second imaging condition setting portion 322A, the first imaging control portion 323, the second imaging control portion 324, the image evaluation portion 325, the correction coefficient updating portion 326, and a model generation portion 327.

In the present embodiment, as in the first embodiment and the second embodiment, the second imaging condition is set based on the first imaging condition and the correction coefficient, and the image evaluation portion 325 evaluates whether the spectroscopic image captured under the second imaging condition is appropriate, that is, whether an abnormality such as halation has occurred. The model generation portion 327 uses the evaluation result by the image evaluation portion 325, the first imaging condition, and the correction coefficient β to generate a correction coefficient output model by machine learning in which the first imaging condition is used as an input and the correction coefficient β is used as an output. The first imaging condition and the correction coefficient β used at the time of model generation are the first imaging condition and the correction coefficient β used for setting the second imaging condition when the spectroscopic image to be evaluated is captured. As machine learning, for example, linear regression, least squares method, various algorithms such as k-NN, or deep learning can be used.

The model generation portion 327 may further generate a correction coefficient calculation model by using the spectral wavelength of the spectroscopic image as teacher data. In this case, the model generation portion 327 can generate a correction coefficient output model in which the first imaging condition and the spectral wavelength λ of the spectroscopic image to be captured are used as input and the correction coefficient $β_{-λ}$ for the corresponding spectral wavelength λ is used as an output.

Further, the model generation portion 327 may generate a correction coefficient calculation model by adding the color image captured by the first camera 21 as teacher data. In this case, in addition to the first imaging condition, a correction coefficient output model can be generated using statistics data such as the average gradation value, the maximum gradation value, and the minimum gradation value of each color component of R (red), G (green), and B (blue) in the color image, as teacher data, and a highly accurate correction coefficient can be calculated.

Next, an imaging method of the present embodiment will be described.

Figure 7:
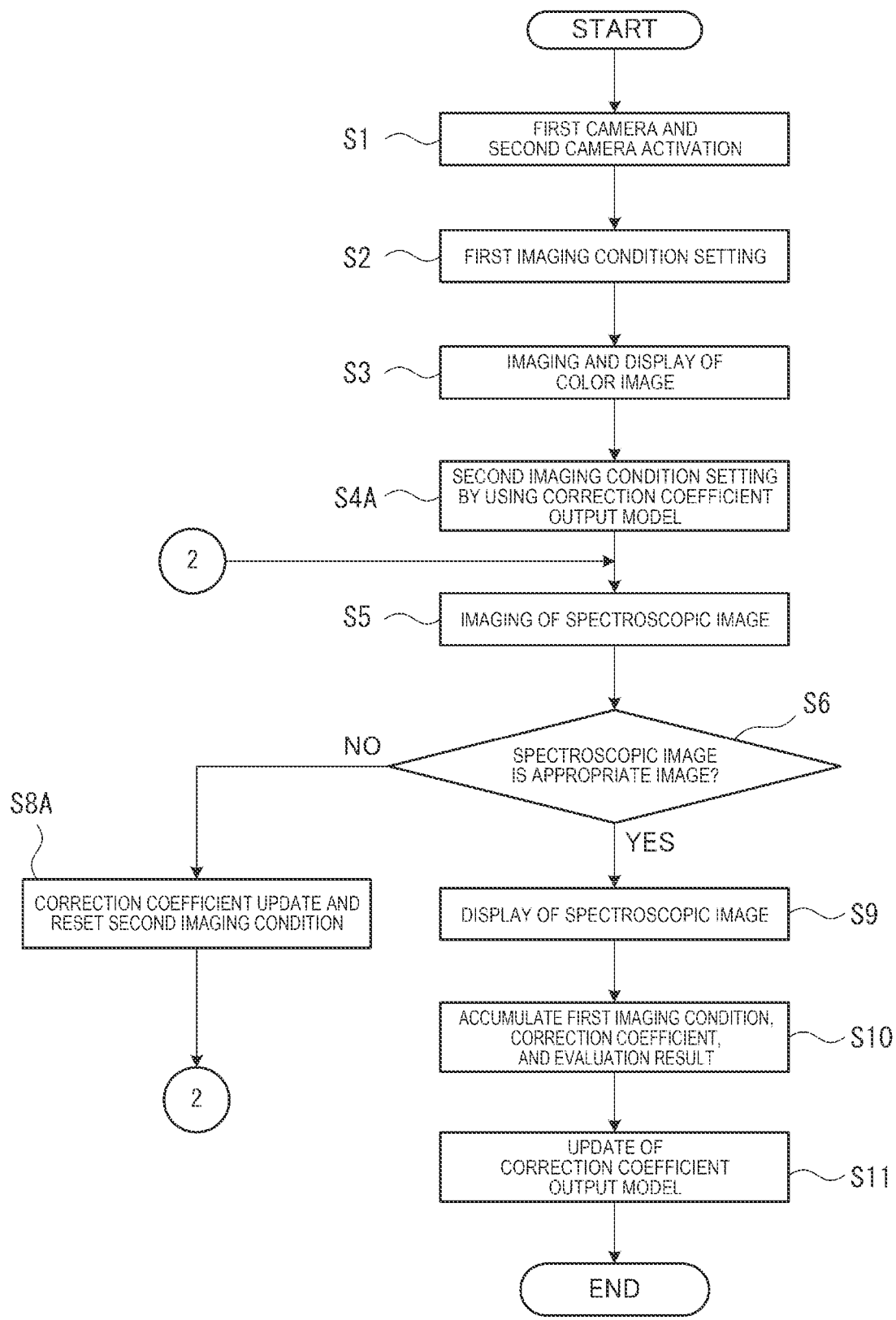
FIG. 7 is a flowchart illustrating an imaging method of a spectroscopic image according to the fourth embodiment.

FIG. 7 is a flowchart illustrating an imaging method of the present embodiment.

In the present embodiment, a spectroscopic image is captured by a method substantially similar to the method of the first embodiment.

In the present embodiment, the user operates the touch panel 11 or the like to select an application for capturing a spectroscopic image, so that the processing of the step S1 is performed, and the control portion 30 activates the first camera 21 and the second camera 22.

Next, the processing of the step S2 is performed, so that the first imaging condition setting portion 321 sets the first imaging condition of the first camera 21, and in the step S3, the first imaging control portion 323 causes the color image captured by the first camera 21 to be displayed on the touch panel 11.

After that, the second imaging condition setting portion 322A inputs the acquired first imaging condition to the correction coefficient output model generated by the model generation portion 327, and sets the second imaging condition based on the output correction coefficient β (step S4A). The method of calculating the second imaging condition is the same as the method of the first embodiment or the like, and for example, the second imaging condition is calculated by multiplying the first imaging condition by the correction coefficient β.

Here, an example is illustrated in which a common correction coefficient β from the correction coefficient output model is output for a plurality of spectral wavelengths, but each correction coefficient $β_{-λ}$ corresponding to a plurality of spectral wavelengths may be output.

After that, in the step S5, the second imaging control portion 324 controls the second camera 22 under the set second imaging condition to image a spectroscopic image, and the step S6 is performed so that the image evaluation portion 325 evaluates whether the captured spectroscopic image is an appropriate image.

Further, in the present embodiment, when it is determined as NO in the step S6, the correction coefficient updating portion 326 updates the correction coefficient β output from the correction coefficient output model in the step S4A, and further, the second imaging condition setting portion 322A sets the second imaging condition based on the updated correction coefficient β (step S8A). The method of updating of the correction coefficient updating portion 326 is the same as the method of the fourth embodiment, and when halation occurs in the spectroscopic image, the correction coefficient β is reduced by a predetermined amount, and when the spectroscopic image is unclear, the correction coefficient β is increased by a predetermined amount. After that, the processing returns to the step S5.

On the other hand, if it is determined as YES in the step S6, the processing of the step S9 is performed, and the captured spectroscopic image or an image based on the spectroscopic image is displayed on the touch panel 11.

In the present embodiment, the model generation portion 327 accumulates the first imaging condition, the correction coefficient β, and the evaluation result obtained in a series of processing in the storage 31 (step S10). When it is never determined as NO in the step S6, the model generation portion 327 accumulates the historical data which associates with the first imaging condition, the correction coefficient β obtained in the step S4A, and the evaluation result of the spectroscopic image for each spectral wavelength, in the storage 31. When it is determined as NO in the step S6, the model generation portion 327 further accumulates, in addition to the historical data which associates with the first imaging condition, the correction coefficient β obtained in step S4A, and the evaluation result of the spectroscopic image, the historical data which associates with the first imaging condition, the correction coefficient updated in the step S8A, and the evaluation result in the step S6 for the spectroscopic image captured under the second imaging condition based on the corresponding correction coefficient, in the storage 31.

After that, the model generation portion 327 reconstructs and updates the correction coefficient output model based on the accumulated historical data (step S11).

The step S11 does not have to be immediately after the spectroscopic image is captured. For example, it may be performed at a fixed cycle every time a spectroscopic image is captured, or it may be performed every time a fixed amount of historical data is accumulated.

In this manner, the correction coefficient output from the correction coefficient output model can be made more accurate by updating the correction coefficient output model based on the accumulated historical data, and it is possible to set the second imaging condition of the above more appropriately when a spectroscopic image is captured.

Working Effect of Fourth Embodiment

In the electronic device 1A of the present aspect, the processor 32 further functions as the image evaluation portion 325 and the model generation portion 327. The image evaluation portion 325 evaluates a spectroscopic image obtained by imaging a target object with the second camera 22 under the second imaging condition. The model generation portion 327 uses the first imaging condition, the correction coefficient and the evaluation result of the image evaluation portion 325 for the spectroscopic image captured under the second imaging condition set by using the correction coefficient β, as teacher data and generates a correction coefficient output model in which the first imaging condition is used as an input and the correction coefficient β is used as an output. The second imaging condition setting portion 322A acquires the correction coefficient β by inputting the first imaging condition into the correction coefficient output model, and sets the second imaging condition based on the correction coefficient β.

In the present embodiment, the model generation portion 327 can generate a correction coefficient output model which outputs an optimum correction coefficient for the first imaging condition by machine learning. Accordingly, the second imaging condition setting portion 322A can obtain an appropriate correction coefficient β according to the first imaging condition simply by inputting the first imaging condition into the correction coefficient output model, and can easily calculate the second imaging condition based on the corresponding correction coefficient β.

Further, by accumulating the first imaging condition, the correction coefficient β at the time of imaging the spectroscopic image, and the evaluation result for the spectroscopic image as historical data, the model generation portion 327 can perform machine learning with the accumulated historical data as teacher data and improve the accuracy of the correction coefficient output model.

MODIFICATION EXAMPLE

The present disclosure is not limited to the embodiment described above, and a modification, an improvements, or the like within the range in which the object of the present disclosure can be achieved are included in the present disclosure.

Modification Example 1

In the first to fourth embodiments, an example is illustrated in which the second imaging condition setting portion 322 sets the second imaging condition by using each of the exposure correction coefficient, the aperture correction coefficient, and the ISO correction coefficient, but the present disclosure is not limited thereto. The second imaging condition setting portion 322 may set at least an exposure correction coefficient and set an exposure time based on the exposure correction coefficient. With respect to the aperture value and the ISO sensitivity, for example, the aperture correction coefficient and the ISO correction coefficient may be set to "1", and the aperture value and the ISO sensitivity of the first imaging condition may be used as they are.

Modification Example 2

In the first to third embodiments, the spectroscopic image is captured with setting the second imaging condition by using the initial value of the correction coefficient β set in advance for the first imaging condition, and when the image evaluation portion determines that the spectroscopic image is not appropriate, control is performed to update the correction coefficient β so that the appropriate spectroscopic image is captured. On the other hand, the second imaging condition setting portion 322 may change the initial value of the correction coefficient β to be initially used based on the first imaging condition and the color image captured by the first camera 21. For example, when the color image captured by the first camera is dark and the gradation value of each pixel is low, large values are set for the exposure time, the aperture value, the focus distance, and the ISO sensitivity, which are the first imaging conditions. In this case, the correction coefficient β may be set to "1", and the second imaging condition may be the same as the first imaging condition to image the spectroscopic image by the second camera 22.

Modification Example 3

In the first to fourth embodiments, the second imaging condition setting portion 322 may display the second imaging condition on the touch panel 11 before imaging the spectroscopic image by the second camera 22. Further, the second imaging condition setting portion 322 may accept the instruction of the user to change the second imaging condition and change the set second imaging condition or correction coefficient according to the instruction of the user.

Accordingly, the user can confirm the second imaging condition before imaging the spectroscopic image, and further, can finely adjust the second imaging condition and the correction coefficient. Accordingly, the spectroscopic image can be captured under the condition desired by the user.

Further, in the fourth embodiment, the model generation portion 327 may accumulate the correction coefficient set by the user and the first imaging condition when the corresponding correction coefficient is set as historical data. Accordingly, the condition according to the preference of the user can be learned, and the correction coefficient output model optimized for every user can be generated.

Modification Example 4

In the first to fourth embodiments, the second imaging condition setting portion 322 calculates the second imaging condition by multiplying the correction coefficient β by the first imaging condition, but the present disclosure is not limited thereto. For example, the second imaging condition setting portion 322 may calculate the second imaging condition by adding or subtracting a correction coefficient with respect to the first imaging condition.

Modification Example 5

In the fourth embodiment, an example is illustrated in which the model generation portion 327 generates a correction coefficient output model in which the first imaging condition is used as an input and the correction coefficient β is used as an output, but the present disclosure is not limited thereto. For example, a correction coefficient output model may be generated in which the first imaging condition is used as an input and the second imaging condition calculated based on the correction coefficient β is used as an output. Further, the model generation port ion 327 may generate a correction coefficient output model in which the first imaging condition and the color image captured by the first camera 21 are used as input and the second imaging condition is used as an output. Further, the output second imaging condition may be the second imaging condition for each spectral wavelength.

Overview of Disclosure

An imaging apparatus according to a first aspect includes a first camera which includes a color filter portion including a red color filter that transmits light in a red wavelength region, a green color filter that transmits light in a green wavelength region, and a blue color filter that transmits light in a blue wavelength region, and a first light receiving portion receiving light transmitted through the color filter portion, and which captures a color image based on a gradation value of red light transmitted through the red color filter, a gradation value of green light transmitted through the green color filter, and a gradation value of blue light transmitted through the blue color filter, a second camera which includes a spectroscopic element configured to disperse light having a predetermined spectral wavelength from incident light and to change the spectral wavelength to four or more wavelengths, and a second light receiving portion receiving the light dispersed by the spectroscopic element, and which captures a spectroscopic image of each wavelength dispersed by the spectroscopic element, a first imaging condition setting portion which sets an imaging condition of the first camera, and a second imaging condition setting portion which sets an imaging condition of the second camera, based on the imaging condition of the first camera.

Accordingly, since the user does not need to set the imaging condition with respect to the second camera which captures the spectroscopic image and the user is not required to have specialized knowledge, either, the convenience when using the second camera is improved. Further, since the second imaging condition is set based on the first imaging condition, it is not necessary to perform a preliminary operation for capturing a spectroscopic image a plurality of times to set the second imaging condition, and it is possible to quickly set the second imaging condition.

In the imaging apparatus of the present aspect, the second imaging condition setting portion sets at least an exposure time as the second imaging condition.

When the second light receiving portion receives light and the light receiving amount exceeds the permissible value, halation occurs in the spectroscopic image, and an appropriate spectroscopic image cannot be captured. The exposure time is most related to the occurrence of such halation, and as in the present aspect, the image abnormality due to halation can be effectively suppressed by appropriately setting the exposure time as the second imaging condition.

In the imaging apparatus of the present aspect, it is preferable that the second imaging condition setting portion sets the second imaging condition by multiplying the first imaging condition by a predetermined correction coefficient.

Accordingly, the second imaging condition setting portion can easily set the second imaging condition by only multiplying the first imaging condition by the correction coefficient, and the time required to image the spectroscopic image can be shortened.

In the imaging apparatus of the present aspect, it is preferable that the second imaging condition setting portion sets the second imaging condition for the spectral wavelengths based on each of the correction coefficients set for each of the spectral wavelengths that can be changed by the spectroscopic element.

In the present aspect, instead of using a common second imaging condition for a plurality of spectral wavelengths, a different correction coefficient is set for every spectral wavelength, and a second imaging condition for every spectral wavelength is set based on the corresponding correction coefficient. Accordingly, the probability that an abnormality such as halation will occur in the spectroscopic image is reduced, and an appropriate spectroscopic image can be captured.

In the imaging apparatus of the present aspect, it is preferable that the correction coefficient is set based on a camera optical characteristic obtained by multiplying a spectral characteristic indicating a transmittance of the spectroscopic element for each wavelength and a light receiving sensitivity characteristic indicating light receiving sensitivity of the second light receiving portion for each wavelength.

When a spectroscopic image is captured by using such camera optical characteristic, it is possible to specify the spectral wavelength at which the light receiving amount of the second light receiving portion tends to exceed the permissible value and the spectral wavelength at which the light receiving amount is difficult to detect and the spectroscopic image tends to be unclear, and it is possible to appropriately set the correction coefficient for calculating the second imaging condition capable of imaging an appropriate spectroscopic image at each spectral wavelength.

In the imaging apparatus of the present aspect, it is preferable that the correction coefficient is set based on a maximum value of a characteristic value of the camera optical characteristic.

In the camera optical characteristic mentioned above, the wavelength at which the specific value becomes the maximum value is a wavelength at which halation is likely to occur in the captured spectroscopic image, and the occurrence of halation can be suppressed for each of the other spectral wavelengths by setting a correction coefficient which can calculate the second imaging condition under which halation does not occur at the corresponding wavelength.

In the imaging apparatus of the present aspect, the correction coefficient may be set based on a minimum value of a characteristic value of the camera optical characteristic.

In the camera optical characteristic mentioned above, the wavelength at which the specific value becomes the minimum value is the wavelength at which the gradation value of each pixel of the captured spectroscopic image is low and the image tends to be unclear (the S/N ratio tends to deteriorate). Accordingly, by setting a correction coefficient which suppresses the deterioration of the S/N ratio at the corresponding wavelength, the deterioration of the S/N ratio can be suppressed for each of the other spectral wavelengths.

In the imaging apparatus of the present aspect, it is preferable to further include an image evaluation portion which evaluates the spectroscopic image obtained by imaging a target object with the second camera under the second imaging condition, a correction coefficient recording portion which stores the correction coefficient, and a correction coefficient updating portion which updates the correction coefficient stored in the correction coefficient recording portion based on an evaluation result by the image evaluation portion.

In the aspect, the spectroscopic image captured by the second camera is evaluated by the image evaluation portion, and when the evaluation result determines that the spectroscopic image is not appropriate, the correction coefficient updating portion updates the correction coefficient. Accordingly, it is possible to set a correction coefficient capable of imaging an appropriate spectroscopic image by repeating the imaging processing of the spectroscopic image a plurality of times and the evaluation of the spectroscopic image by the image evaluation portion.

In the imaging apparatus of the present aspect, it is preferable to include an image evaluation portion which evaluates the spectroscopic image obtained by imaging a target object with the second camera under the second imaging condition, and a model generation portion which generates a correction coefficient output model in which the first imaging condition, the correction coefficient, and the evaluation result of the image evaluation portion for the spectroscopic image captured under the second imaging condition set by using the correction coefficient, are used as teacher data, and the first imaging condition is used as an input and the correction coefficient is used as an output, in which the second imaging condition setting portion acquires the correction coefficient by inputting the first imaging condition into the correction coefficient output model and sets the second imaging condition based on the correction coefficient.

In this case, the model generation portion can generate a correction coefficient output model which outputs an optimum correction coefficient for the first imaging condition by machine learning. Accordingly, the second imaging condition setting portion can obtain an appropriate correction coefficient β according to the first imaging condition by inputting the first imaging condition into the correction coefficient output model, and can easily calculate the second imaging condition based on the corresponding correction coefficient β.

Further, by accumulating the first imaging condition, the correction coefficient β at the time of imaging the spectroscopic image, and the evaluation result for the spectroscopic image as historical data, the model generation portion can perform machine learning with the accumulated historical data as teacher data and improve the accuracy of the correction coefficient output model.

A portable terminal apparatus of a second aspect of the present disclosure includes the imaging apparatus of the first aspect and a housing in which the imaging apparatus is incorporated.

The portable terminal apparatus as in the present aspect is, for example, a terminal apparatus such as a smartphone, a tablet terminal, and a head-mounted display, and is required to improve user convenience. By incorporating the imaging apparatus mentioned above in such a portable terminal apparatus, the convenience of the user can be improved.

An imaging method of a third aspect of the present disclosure is an imaging method of an imaging apparatus including a first camera which includes a color filter portion including a red color filter that transmits light in a red wavelength region, a green color filter that transmits light in a green wavelength region, and a blue color filter that transmits light in a blue wavelength region, and a first light receiving portion receiving light transmitted through the color filter portion, and which captures a color image based on a gradation value of red light transmitted through the red color filter, a gradation value of green light transmitted through the green color filter, and a gradation value of blue light transmitted through the blue color filter, and a second camera which includes a spectroscopic element configured to disperse light having a predetermined spectral wavelength from incident light and to change the spectral wavelength to four or more wavelengths, and a second light receiving portion receiving the light dispersed by the spectroscopic element, and which captures a spectroscopic image of each wavelength dispersed by the spectroscopic element, including setting a first imaging condition which is an imaging condition of the first camera, and setting a second imaging condition, which is an imaging condition of the second camera, based on the first imaging condition.

Accordingly, as in the first aspect described above, since the user does not need to set the imaging condition with respect to the second camera which captures the spectroscopic image and the user is not required to have specialized knowledge, either, the convenience when using the second camera is improved. Further, since the second imaging condition is set based on the first imaging condition, it is not necessary to perform a preliminary operation for capturing a spectroscopic image a plurality of times to set the second imaging condition, and it is possible to quickly set the second imaging condition.

What is claimed is:

1. An imaging apparatus comprising:
a first camera which includes a color filter portion including a red color filter that transmits light in a red wavelength region, a green color filter that transmits light in a green wavelength region, and a blue color filter that transmits light in a blue wavelength region, and a first light receiving portion receiving light transmitted through the color filter portion, and which captures a color image based on a gradation value of red light transmitted through the red color filter, a gradation value of green light transmitted through the green color filter, and a gradation value of blue light transmitted through the blue color filter;
a second camera which includes a spectroscopic element configured to disperse light having a predetermined spectral wavelength from incident light and to change the predetermined spectral wavelength to four or more spectral wavelengths, and a second light receiving portion receiving the light dispersed by the spectroscopic element, and which captures a spectroscopic image of each wavelength dispersed by the spectroscopic element; and
one or more processors configured to:
store a predetermined correction coefficient in a memory;
set a first imaging condition which is an imaging condition of the first camera, wherein the first imaging condition includes at least a first exposure time;
set a second imaging condition, which is an imaging condition of the second camera, based on the first imaging condition, wherein
the second imaging condition includes at least a second exposure time,
the second exposure time is different from the first exposure time,
the second exposure time associated with the second camera is based on the first exposure time associated with the first camera, and
the second exposure time is set by multiplication of the first exposure time with a predetermined correction coefficient;
evaluate the spectroscopic image that is obtained by imaging a target object with the second camera based on the second imaging condition;
calculate, based on the evaluation that the spectroscopic image is an inappropriate image, a new correction coefficient from the stored predetermined correction coefficient; and
update the second imaging condition based on the new correction coefficient, wherein the target object is reimaged with the second camera based on the updated second imaging condition.

2. The imaging apparatus according to claim 1, wherein the one or more processors are further configured to set the second imaging condition for the spectral wavelengths based on the predetermined correction coefficient set for each of the spectral wavelengths which can be changed by the spectroscopic element.

3. The imaging apparatus according to claim 1, wherein the predetermined correction coefficient is set based on a camera optical characteristic obtained by multiplying a spectral characteristic indicating a transmittance of the spectroscopic element for each wavelength and a light receiving sensitivity characteristic indicating light receiving sensitivity of the second light receiving portion for each wavelength.

4. The imaging apparatus according to claim 3, wherein the predetermined correction coefficient is set based on a maximum value of a characteristic value of the camera optical characteristic.

5. The imaging apparatus according to claim 3, wherein the predetermined correction coefficient is set based on a minimum value of a characteristic value of the camera optical characteristic.

6. The imaging apparatus according to claim 1, wherein the one or more processors is further configured to:
    evaluate the spectroscopic image obtained by imaging a target object with the second camera under the second imaging condition,
    generate a correction coefficient output model in which the first imaging condition, the predetermined correction coefficient, and an evaluation result of an image evaluation portion for the spectroscopic image captured under the second imaging condition set by using the corresponding predetermined correction coefficient are used as teacher data, the first imaging condition is used as an input and the predetermined correction coefficient is used as an output, and
    acquire the predetermined correction coefficient by inputting the first imaging condition into the correction coefficient output model, and set the second imaging condition based on the correction coefficient.

7. A portable terminal apparatus comprising the imaging apparatus according to claim 1; and
    a housing in which the imaging apparatus is incorporated.

8. An imaging method of an imaging apparatus including a first camera which includes a color filter portion including a red color filter that transmits light in a red wavelength region, a green color filter that transmits light in a green wavelength region, and a blue color filter that transmits light in a blue wavelength region, and a first light receiving portion receiving light transmitted through the color filter portion, and which captures a color image based on a gradation value of red light transmitted through the red color filter, a gradation value of green light transmitted through the green color filter, and a gradation value of blue light transmitted through the blue color filter, and a second camera which includes a spectroscopic element configured to disperse light having a predetermined spectral wavelength from incident light and to change the predetermined spectral wavelength to four or more wavelengths, and a second light receiving portion receiving the light dispersed by the spectroscopic element, and which captures a spectroscopic image of each wavelength dispersed by the spectroscopic element, the method comprising:
    storing a predetermined correction coefficient in a memory;
    setting a first imaging condition which is an imaging condition of the first camera, wherein the first imaging condition includes at least a first exposure time;
    setting a second imaging condition, which is an imaging condition of the second camera, based on the first imaging condition, wherein
        the second imaging condition includes at least a second exposure time,
        the second exposure time is different from the first exposure time,
        the second exposure time associated with the second camera is based on the first exposure time associated with the first camera, and
        the second exposure time is set by multiplication of the first exposure time with a predetermined correction coefficient;
    evaluating the spectroscopic image that is obtained by imaging a target object with the second camera based on the second imaging condition;
    calculating, based on the evaluation that the spectroscopic image is an inappropriate image, a new correction coefficient from the stored predetermined correction coefficient; and
    updating the second imaging condition based on the new correction coefficient, wherein the target object is reimaged with the second camera based on the updated second imaging condition.

* * * * *